Jan. 5, 1937. 2,066,966

W. DIETERLE ET AL

MANUFACTURE OF LIGHT SENSITIVE MATERIALS

Filed Feb. 4, 1932

*Fig.1*

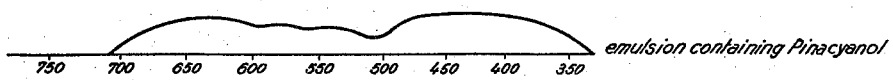

emulsion containing Pinacyanol

*Fig. 2*

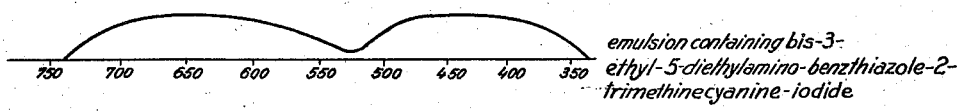

emulsion containing bis-3-ethyl-5-diethylamino-benzthiazole-2-trimethinecyanine-iodide

*Fig. 3*

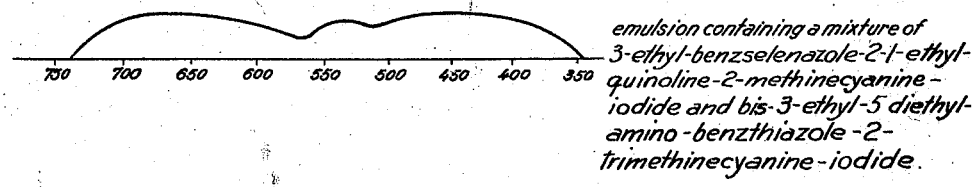

emulsion containing a mixture of 3-ethyl-benzselenazole-2-1-ethyl-quinoline-2-methinecyanine-iodide and bis-3-ethyl-5 diethyl-amino-benzthiazole-2-trimethinecyanine-iodide.

Walter Dieterle,
Walter Zeh,
Werner Gerweck,
Inventors;

By Philip S. Hopkins,
Attorney.

Patented Jan. 5, 1937

2,066,966

UNITED STATES PATENT OFFICE 2,066,966

MANUFACTURE OF LIGHT SENSITIVE MATERIALS

Walter Dieterle and Walter Zeh, Dessau in Anhalt, and Werner Zerweck, Frankfort-on-the-Main-Fechenheim, Germany, assignors to Agfa Ansco Corporation, Binghamton, N. Y., a corporation of New York Application February 4, 1932, Serial No. 590,940
In Germany February 7, 1931

9 Claims. (Cl. 95—7)

Our present invention relates to the sensitizing of photographic emulsions.

One of its objects is to provide such an emulsion the sensitivity of which is raised over the range of wave lengths to which the emulsion is normally sensitive. Further objects will be seen from the detailed specification following hereafter.

We have found that the cyanines having introduced in their molecule an amino group and corresponding to the general formula Formula 1:

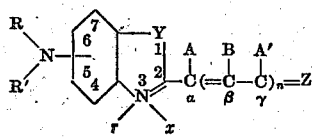

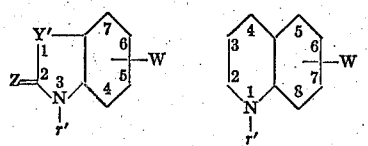

$Y = S$, Se, Te,
$Y' = S$, Se, Te, $C(CH_3)_2$, O, $W = H$, $N\diagdown\substack{R\\R'}$ , alkyl, alkoxy, A, A', r, r' and R'=H, alkyl,
B = H, alkyl, alkoxy,
R = H, alkyl, aryl, acyl,
$n = 0$ or 1,
X = halide, $ClO_4$, are particularly suited for sensitizing photographic emulsions. The dyes are characterized by their sensitizing efficiency and their stability against agents used for stabilizing the emulsions, for instance, potassium bromide.

The amino group having the radicals R and R' may be introduced at the position 4, 5, 6 or 7, the 5 and 6 position being preferred. There may further be present in the benzene nucleus monovalent radicals, e. g. alkyl, alkoxy in any desirable position.

We will now discuss the different groups of our new class of dyes in the light of the formulae, which result from the general formula given above by replacing Z by the different radicals indicated.

The groups are corresponding to the formula:

Formula 2:

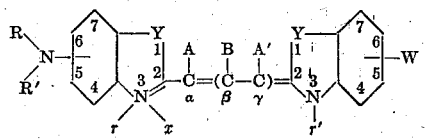

Formula 3:

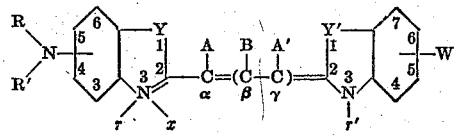

Formula 4:

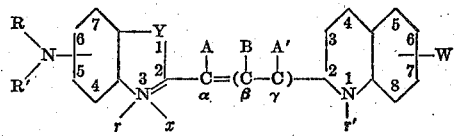

and may be divided into symmetrical compounds and unsymmetrical compounds. Symmetrical compounds are only the benzthiazole-methine cyanines and benzthiazole-trimethinecyanines, provided that Y is sulfur, which may be derived from Formula 2 if W represents

and is introduced in both benzthiazole nuclei at corresponding positions. The benzthiazole-methinecyanines differ from the benzthiazole-trimethinecyanines in that the index n of the part put in parenthesis is 0 or 1 respectively. They correspond to the following formulae:

Formula 5 (benzthiazole-methinecyanines):

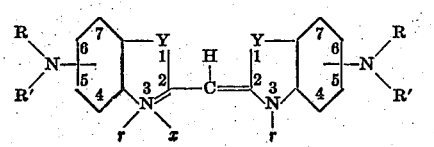

Formula 6 (benzthiazole-trimethinecyanines):

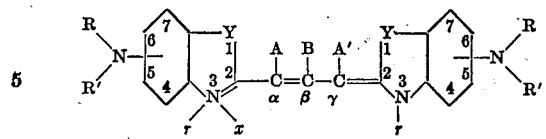

In the formula of the benzthiazole-methinecyanines the amino group may take the places 4, 5, 6 and 7. R may represent H, or alkyl, for instance, methyl, ethyl, or aryl, for instance, phenyl, naphthyl, or a substituted aryl, or acyl, for instance, benzoyl, acetyl and propionyl. R' may be alkyl in the case of R being alkyl or aryl, or R' is hydrogen in the case of R being acyl. X may represent any suitable anion that will precipitate the dye, for instance, a halide, paratoluene sulfonate, alkylosulfate, perchlorate, nitrate, or the like. A of Formula 2 may be H or alkyl, like methyl or ethyl for the benzthiazole-methinecyanines. Due to the symmetrical structure of the compounds $r$ and $r'$ of Formula 2 are represented by the same radicals $r$, for instance, H, or an alkyl radical, such as methyl or ethyl.

The benzthiazole-trimethinecyanines (cf. Formula 6) may be substituted in the manner indicated for the benzthiazole-methinecyanines, however, in the molecule of these compounds the carbon bridge likewise may be substituted. Due to the symmetrical structure of the benzthiazole-trimethinecyanines A and A' of Formula 2 represent the same group A, for instance, H, or alkyl, such as methyl or ethyl, B may be H or an alkyl radical, such as methyl, butyl, isobutyl, or capryl, or alkoxy, for instance, $OC_2H_5$. We wish to make clear that preferably only either B or A and A' together may be replaced by the groups just mentioned, the remaining C atom or atoms being linked to hydrogen.

Unsymmetrical compounds derived from Formula 2 are the compounds in which W is either not the same group as

for instance, being H or if being the same group this

group has a position different from that of the

group in the other nucleus. This statement is illustrated by the following formulae:

Formula 7:

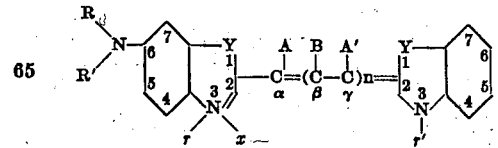

Formula 8:

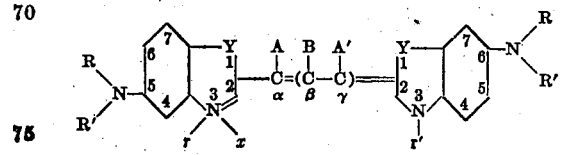

In Formulae 7 and 8, likewise in all unsymmetrical compounds which can be derived from general Formula 1, in the bridge the substituents A or A' may represent an alkyl, for instance, methyl or ethyl, it being understood that A is different from A', for example if A is a methyl A' may be ethyl. B is for the asymmetric compounds always hydrogen. The amino group may have in both Formulae 7 and 8 the positions 4, 5, 6 and 7. R and R' may represent the same radicals as indicated for the benzthiazole-methinecyanines, X likewise represents the same groups as in the benzthiazole-methinecyanines. $r$ and $r'$ may be in Formulae 7 and 8, as well as in all unsymmetrical cyanines derived from general Formula 1 the same radicals or they may be different and represent the same radicals enumerated for the benzthiazole-methinecyanines. In order to illustrate the nomenclature it may be in Formula 7:

$R = R' = CH_3$
$A = CH_3$
$A' = C_2H_5$
$B = H$
$r = C_2H_5$
$r' = CH_3$
$X = I$
$Y = S$
$n = 1$.

If in this case the amino group be in position 6 we obtain the compound [3-ethyl-6-diethylaminobenzthiazole-(2)]—[3-methyl-benzthiazole-(2)]—α-methyl-γ-ethyl-trimethinecyanine iodide of the formula:

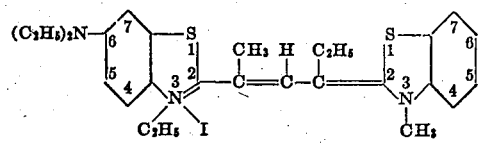

If in Formula 8 the same radicals have identical position and the second amino group be in position 5 we obtain the compound [3-ethyl-6-diethylamino-benzthiazole-(2)]—[3-methyl- 5- diethylaminobenzthiazole-(2)] — α-methyl-γ-ethyl-trimethinecyanine iodide.

The compounds derived from Formula 3 are unsymmetrical and R, R', A, A', X, $r$ and $r'$ may represent the same groups as in Formulae 7 and 8. In Formula 3 W may be

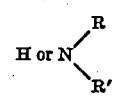

The amino groups may have the positions 4, 5, 6 and 7. Y and Y' are different elements of the group comprising S, Se, Te, $C(CH_3)_2$ and O. If Y is sulfur, Y' selenium and $n$ is O we call the dye a benzthiazole-benzselenazole-methinecyanine. In the case of Y being sulfur, Y' being $C(CH_3)_2$, and $n$ being O we call the dye a benzthiazole-indole-methinecyanine, and if under the same conditions Y' is O we call the dye a benzthiazole-benzoxazole-methinecyanine.

In Formula 4 substitution may be effected in the same manner as indicated for Formula 3 with respect to R, R', A, A', X, $r$ and $r'$. The quinoline nucleus may be substituted in known manner by alkyl groups, alkoxy groups and amino or substituted amino groups. Furthermore this nucleus may be linked to the carbon bridge in position 2 or 4. In case of the quinoline nucleus being linked to the bridge in position 2 and Y is sulfur, we call the dye a [benzthiazole-(2)]—

[quinoline-(2)]—methinecyanine and a [benzthiazole-(2)]—[quinoline-(4)]—methinecyanine if the quinoline nucleus is linked in position 4 to the bridge, $n$ being in both cases 0.

The benzthiazole or benzselenazole nucleus may contain besides the amino group one or several alkyl groups such as methyl or ethyl groups, or alkoxyl groups, such as methoxy groups or ethoxy groups, or both alkyl and alkoxyl groups.

With respect to the sensitizing action of our new compounds reference is made to the accompanying drawing in which Figures 1, 2 and 3 show spectrograms of different dyes added to photographic emulsions for increasing their sensitiveness to rays of different wave length.

In these spectograms the abscissae are graduated in millimicrons ($\mu\mu$) while the ordinates are graduated in divisions denoting the blackening of the tested film. The blackenings are obtained by exposing the film in a diffraction grating spectograph of Carl Zeiss Jena provided with a Rowland diffraction grating and illuminating with a nitra lamp of 100 watt through a stage slot. The emulsion showing curve 1 contains the known dye Pinacyanol in a quantity of about 20 milligrams on 1 kg. of an emulsion ready for being cast corresponding to about 140 grams of dry emulsion. The emulsion showing curve 2 is sensitized with about 10 milligrams of bis-[3-ethyl-5-diethylamino-benzthiazole-(2)]-trimethine-cyanine iodide (see Example 8) incorporated in 1 kg. of an emulsion ready for being cast corresponding to about 140 grams of dry emulsion. The emulsion showing curve 3 is sensitized with a mixture of about 16 milligrams of the known dye [3-ethyl-benzselenazole-(2)]-[1-ethyl-quinoline-(2)] methinecyanine icdide and about 12 milligrams of bis-[3-ethyl-5-diethylamino-benzthiazole-(2)]-trimethinecyanine iodide, incorporated in 1 kg. of an emulsion ready for being cast corresponding to about 140 grams of dry emulsion. The emulsion used was obtained according to the boiling process, but an emulsion made according to the ammonia process will give analogous results. When comparing the curves the superiority of our new dyes will be easily seen. This superiority is still more evident when considering that on an addition of 2 milligrams of potassium bromide to 1 gram of dry emulsion practically no decrease of the sensitization takes place, whereas with the hitherto known dyes the intensity is essentially decreased by addition of such quantities of potassium bromide to the dry emulsion. The spectrogram, Figure 3, of the emulsion containing the mixture of [3-ethyl-benzselenazole-(2)]-[1-ethyl-quinoline-(2)]-methinecyanine iodide and bis-[3-ethyl-5-diethylamino-benzthiazole-(2)]-trimethinecyanine iodide shows a very good panchromatic sensitization which likewise remains unaltered when adding potassium bromide to the said emulsion.

Other dyes of those herein described yield similar curves when incorporated in a photographic emulsion and investigating this emulsion under the conditions set forth.

By introducing different substituents in the molecule of the dyes a displacement of the range of sensitivity towards the region of the longer waves takes place. This fact may be illustrated by the following statement.

(1) The addition to a silver halide emulsion of the known dye bis-[3-ethyl-benzthiazole-(2)]-trimethinecyanine iodide produces a maximum sensitiveness to a wave length of about 595 $\mu\mu$.

(2) Contrary thereto our new dye bis-[3-ethyl-6-diethylamino-benzthiazole-(2)]-trimethinecyanine iodide produces a maximal sensitiveness to a wave length of about 655 $\mu\mu$.

The introduction of one diethylamino group into the benzene nucleus of the benzthiazole-trimethinecyanine at the place of hydrogen effects a displacement of about 30 $\mu\mu$, the relations being additive.

(3) The known dye bis-[3-ethyl-benzselenazole-(2)]-trimethinecyanine iodide effects a maximum sensitiveness to a wave length of about 615 $\mu\mu$.

(4) However, when using our new dye bis-[3-ethyl-5-diethylamino-benzselenazole-(2)]-trimethinecyanine iodide a maximum sensitiveness to a wave length of 670 $\mu\mu$ is reached.

Thus the introduction of one diethylamino group into the benzene nucleus of the benzselenazole-trimethinecyanines at the place of hydrogen effects a displacement of about 28 $\mu\mu$.

As seen there is a slight difference between the replacement of hydrogen in the benzene nucleus by a substituted amino group in the molecule of the thiazole-methinecyanines and the selenazole-methinecyanines. It is to be understood that the foregoing statement is given only by way of example. Other radicals which have already been mentioned may represent R and R'; furthermore A, A' and B may likewise represent different radicals already mentioned which cause a displacement of the range of sensitiveness with respect to each other. The replacement of $r$ and $r'$ by different radicals is of minor efficiency for displacing the range of sensitiveness. The radicals representing X are of no influence in the purpose set forth. The influence on the displacement of the maximum sensitiveness and on the intensity of the sensitiveness can easily be determined by a few comparative experiments.

The dyes are obtainable according to the desired solubility in form of the bromide, iodide, perchlorate etc. and are used in a quantity as usual for the known sensitizing dyes. This quantity amounts to 8 to 25 milligrams per 1 kg. of emulsion ready for being cast which contains about 9 per cent of gelatin, 4.5 per cent of silver-halide, the rest being water. We do not wish to limit our invention exactly to the quantities just indicated, the most suitable amount will be found in each particular case by a few simple experiments. The dyes may be added to the emulsion in form of solutions. Suitable solvents are the alcohols, for instance, methyl or ethyl alcohol, which may be used anhydrous or diluted with water. The dyes are applied to the emulsion during any stage of their production, however they are preferably added to the finished emulsion before being cast. The dyes may likewise be added by coating the emulsion with them or by bathing the finished photographic materials in a bath in which the dye is dissolved.

The production of the 4-, 5-, 6- or 7-amino-substituted 2-methyl-benzthiazoles serving as a starting material for preparing the dyes is described in Examples 1 to 9. Other bases than those described in these examples may be produced in an analogous manner. The method of preparing our new dyes from the bases is analogous to known methods and illustrated in Examples 10 to 26.

*Example 1.*—The preparation of 2-methyl-6- amino-benzthiazole corresponding to the formula

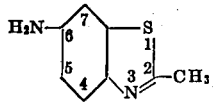

is described in U. S. Patent 1,758,385 and reference is made thereto.

*Example 2.*—The base 2-methyl-5-amino-benzthiazole corresponding to the formula

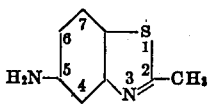

is obtained by reducing the corresponding nitro compound whose method of preparation is known (cf. Friess, Ann. 454 page 177), for instance, with iron and acetic acid. The amino compound is easily soluble in alcohol, glacial acetic acid and benzene. It can be easily recrystallized from water or benzene and forms colorless crystals which melt at about 103° C.

*Example 3.*—The base 2.6-dimethyl-5-amino-benzthiazole corresponding to the formula

can be obtained in two ways.

According to the first way we proceed as follows: 2-amino-4-acetylamino-toluol corresponding to the formula

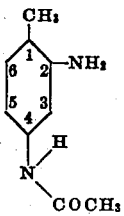

is first rhodanated with NH$_4$SCN and Br in its methyl-alcoholic solution in the manner described in U. S. Patent 1,787,315 and then with an aqueous ammoniacal solution. The formed product, probably the 2.5-diamino-6-methyl-benzthiazole corresponding to the formula

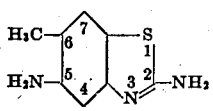

obtained from its aqueous solution in the form of colorless crystals which melt at about 200° C. is split up by heating the same with an aqueous solution of caustic potassium of about 50 per cent strength in the manner described in U. S. Patent 1,788,297 into a compound corresponding to the formula

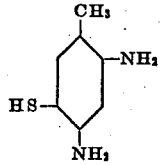

The zinc mercaptide of this compound is transformed into the 2.6-dimethyl-5-acetylamino-benzthiazole with a melting point of about 178° C. corresponding to the above formula by heating the aforesaid mercaptide with acetic anhydride.

According to the second way 3-chloro-4-acetyl-amino-6-nitrotoluene having a melting point of 143° C. is transformed into 2.6-dimethyl-5-nitro-benzthiazole forming compact, colorless crystals when crystallized from alcohol which melt at about 106° C. This compound yields the 2.6-dimethyl-5-amino-benzthiazole when reduced with iron and acetic acid forming colorless crystals which melt at about 143° C. The thiazole can be easily acetylated.

*Example 4.*—The base 2.4-dimethyl-6-amino-benzthiazole corresponding to the formula

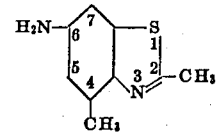

is obtained as follows. Acetyl-toluylene-diamine corresponding to the formula

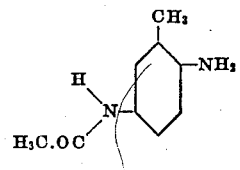

is by means of S$_2$Cl$_2$ transformed into the thiaz-thionium-compound in the manner described in U. S. Patent 1,637,023. When treating this compound with a solution of caustic alkali according to U. S. Patent 1,243,710 the corresponding o-amino-mercaptan corresponding to the formula

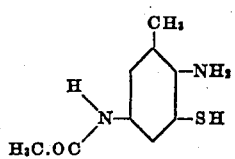

is obtained. By heating this compound with acetic anhydride it is transformed into 2.4-dimethyl-6-acetylamino-benzthiazole which crystallizes from its aqueous solution in form of colorless crystals melting at about 177° C. By saponification with hydrochloric acid there results the 2.4-dimethyl-6-amino-benzthiazole which forms colorless crystals melting at about 118° C.

*Example 5.*—The base 2.4.6-trimethyl-7-amino-benzthiazole corresponding to the formula

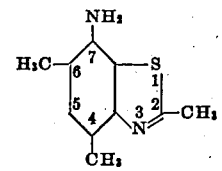

is obtainable as follows. Amino-acetylamino-xylidin corresponding to the formula

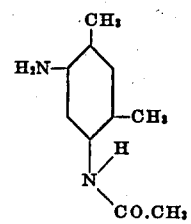

is rhodanated according to U. S. Patent 1,787,315 whereby 2-amino-4.6-dimethyl-7-acetylamino-benzthiazole corresponding to the formula

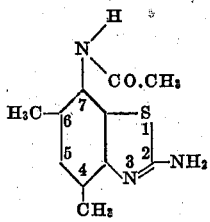

and melting at about 285° C. is obtained. By boiling this compound with a strong aqueous solution of caustic alkali according to U. S. Patent 1,788,297 it is split up to the corresponding o-amino-mercaptan, which may be separated from the reaction mixture in form of the zinc mercaptide. By heating with acetic anhydride the 2.4.6-trimethyl-7-acetylamino-benzthiazole is obtained. After recrystallization from its alcoholic solution this compound forms colorless crystals melting at about 208° C. By saponification with hydrochloric acid the 2.4.6-trimethyl-7-amino-benzthiazole is obtained in the form of colorless crystals melting at about 128° C.

*Example 6.*—The base 2-methyl-6-dimethylamino-benzthiazole corresponding to the formula

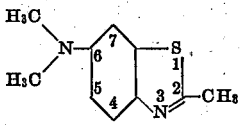

has already been described: cf. Bernthsen, Ann. 251, page 29.

*Example 7.*—The base 2-methyl-6-diethylamino-benzthiazole corresponding to the formula

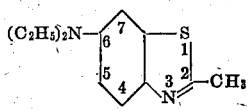

is obtainable in a manner analogous to the preparation of the dimethyl compound (cf. Example 1). The chloride forming colorless crystals is easily soluble in water and decomposes when heated to a temperature of about 160° C. under strong evolution of gas. If the base is set free from the chloride by means of an aqueous solution of caustic alkali it separates in the form of a yellow oil which solidifies upon cooling.

*Example 8.*—The base 2-methyl-5-dimethylamino-benzthiazole corresponding to the formula

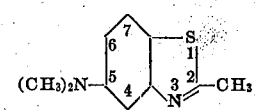

is obtainable as follows. p-bromo-dimethylaniline is nitrated in a mixture of concentrated nitric and sulfuric acids. The formed p-bromo-nitro-dimethylaniline (orange crystals) is transformed into p.p'-tetramethyl-diamino-o.o'-dinitro-diphenyl-disulfide (red crystals when crystallized from chlorobenzene) by heating it with the calculated quantity of Na2S2. From this compound there results p-dimethyl-amino-o-amino-thiophenol by reduction with sodium sulfide in an aqueous alkaline suspension. The latter compound is transformed into 2-methyl-5-dimethyl-amino-benzthiazole by a treatment with acetic anhydride. The chloride forms colorless crystals which are insoluble in ether, but easily soluble in water.

*Example 9.*—The base 2.4-dimethyl-6-phenylamino-benzthiazole corresponding to the formula

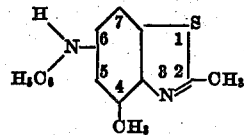

is obtainable by heating 2-amino-3-methyl-5-phenylamino-thiophenol-zinc (cf. U. S. Patent 1,588,384) with acetic anhydride. After crystallizing the compound from benzene it forms colorless crystals which melt at about 138° C. and are easily soluble in benzene, alcohol and glacial acetic acid.

*Example 10.*—For producing the dye bis-[3-ethyl-5-diethylamino-benz-thiazole-(2)]-β-methyl-trimethinecyanine; corresponding to the formula

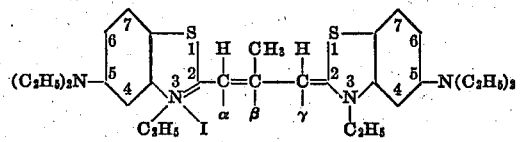

10 grams of 2-methyl-5-diethylamino-benzthiazole-ethyl-iodide of the formula

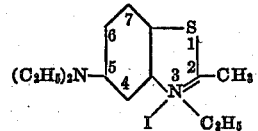

in 20 cc. of dry pyridine are boiled for 1 hour with 10 cc. of ethyl-ortho-acetate. After cooling the dye is precipitated from the dark-violet-blue solution in pyridine by addition of water. From the solution in alcohol green crystals having the form of needles are obtainable. The dye is easily soluble in alcohol; the blue alcoholic solution shows an absorption maximum at a wave length of about 598μμ.

Incorporated in a silver-halide emulsion the dye imparts to it range of sensitiveness from about 510μμ to 705μμ, with a maximum at about 630μμ.

*Example 11.*—For producing the dye bis-[3-ethyl-5-diethylamino-benzthiazole-(2)]-β-ethyl-trimethine-cyanine; corresponding to the formula

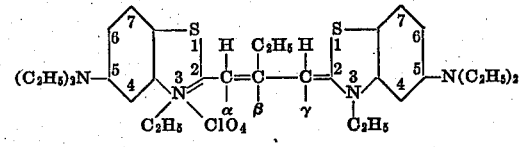

10 grams of 2-methyl-5-diethylamino-benzthiazole-ethyl-iodide dissolved in 20 cc. of pyridine are boiled for about 1 hour with 10 cc. of ethyl ortho-propionate. After cooling the dye is precipitated from the blue pyridine solution with the aid of an aqueous solution of sodium perchlorate of about 5 per cent strength. The dye is then separated by filtration and washed with water. Recrystallized from its solution in alcohol the dye yields a dark green crystal powder.

The light-blue solution of the dye in alcohol shows an absorption maximum at a wave length of about 610μμ.

Incorporated in a silver-halide emulsion the dye imparts to it a range of sensitiveness from about 510μμ to about 720μμ with a maximum at about 640μμ.

*Example 12.*—For producing the dye bis-[3-ethyl-5-diethylamino-6-methyl-benzthiazole- (2)]-β-methyl-trimethinecyanine; corresponding to the formula

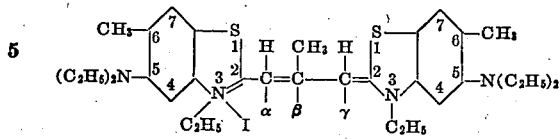

10 grams of 2.6-dimethyl-5-diethylamino-benzthiazole-ethyl-iodide dissolved in 20 cc. of pyridine are boiled for about one hour with 10 cc. of ethyl-ortho-acetate, then the dye is precipitated by addition of a small quantity of an aqueous solution of potassium iodide of about 5 per cent strength, the dye is separated by filtration and washed with water. From its solution in alcohol the dye is obtained in dark green crystals.

The blue solution of the dye in alcohol shows an absorption maximum at a wave length of about $600\mu\mu$.

Incorporated in a silver-halide emulsion the dye imparts to it a range of sensitiveness from about 500 to $710\mu\mu$ with a maximum at about $580\mu\mu$ which is very flat.

*Example 13.*—The dye bis-[3-ethyl-6-diethylamino - benzthiazole -(2)]-β-methyl-trimethinecyanine perchlorate corresponding to the formula

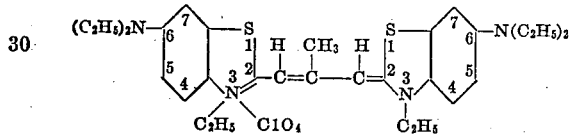

is obtained by condensation of 5 grams of 6-diethylamino-2- methyl - benzthiazole-ethyl-iodide dissolved in 10 cc. of pyridine with 5 cc. of ethyl ortho-acetate while heating for about ½ hour to 140° C. The dye is precipitated from the resulting mixture with the aid of an aqueous solution of sodium perchlorate of about 5 per cent strength. From its solution in alcohol the dye is obtained in the form of green needles.

The blue solution of the dye in alcohol shows an absorption maximum at a wave length of about $610\mu\mu$.

Incorporated in a silver-halide emulsion the dye imparts to it a range of sensitiveness from about $510\mu\mu$ to about $715\mu\mu$ with a maximum at about $645\mu\mu$.

*Example 14.*—For producing the dye bis-[3-methyl-6-acetylamino - benzthiazole-(2)]-methinecyanine; iodide corresponding to the formula

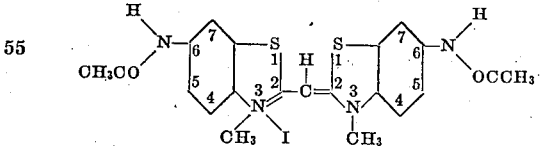

3 grams of 2-methyl-6-acetylamino-benzthiazole-methyl-iodide are heated with 25 cc. of acetic anhydride until the solution is boiling, whereupon 1 cc. of isoamylnitrite is added. While the reaction mixture is vehemently frothing the formed dye precipitates in the form of yellow flakes, which are separated from the solution by filtration, washed with acetone and warmed water, and recrystallized from methanol.

The solution of the dye in methanol has a lemon yellow color and shows an absorption maximum at a wave length of about $445\mu\mu$.

Incorporated in a silver-halide emulsion the dye imparts to it a range of sensitiveness from about $460\mu\mu$ to $520\mu\mu$ with a maximum at about $465\mu\mu$.

*Example 15.*—For producing the dye [3-ethyl-6 - diethylamino - benzthiazole - (2)]-[1 - ethyl - quinoline-(2)]-methinecyanine; iodide

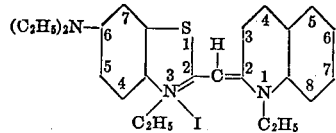

a mixture of 7.5 grams of 2-methyl-6-diethylamino-benzthiazole-ethyl-iodide, 8.5 grams of 2-iodoquino-ethyl-iodide and 100 cc. of alcohol is heated until boiling. To this mixture a solution of 2.5 grams of pure potassium hydroxide in about 50 cc. alcohol is gradually added, whereupon the mixture takes immediately a dark red color. After having continued heating for about 10 minutes the mixture is allowed to cool, whereupon the formed dye is precipitated by addition of a small quantity of an aqueous solution of potassium iodide of about 5 per cent strength, separated from the reaction mixture by filtration and recrystallized from alcohol.

The dye is obtained in the form of red-brown thin leaf lamellae. Its solution in alcohol shows a claret color and a dull absorption maximum at a wave length of about $520\mu\mu$.

Incorporated in a silver-halide emulsion the dye imparts to it a range of sensitiveness from about $480\mu\mu$ to $645\mu\mu$ with a maximum at about $545\mu\mu$.

*Example 16.*—For producing the dye [3-ethyl-6 - diethylamino - benzthiazole - (2)]-[1 - ethyl - quinoline - (4)] - methinecyanine iodide corresponding to the formula

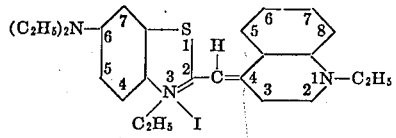

a solution of 7.5 grams of 5-diethylamino-2-methyl-benzthiazole-ethyl-iodide and 10 grams of quinoline-ethyl-iodide in 100 cc. of alcohol are heated until boiling. To the boiling solution we add 2.5 grams of potassium hydroxide dissolved in about 50 cc. of anhydrous alcohol, continue with boiling for about 10 minutes the reaction mixture which has become carmine, add a small quantity of an aqueous solution of potassium iodide of about 5 per cent strength and allow to cool. Then we separate the dye by filtration and recrystallize it from alcohol.

The alcoholic solution of the dye shows a carmine color and an absorption maximum at a wave length of about $545\mu\mu$.

Incorporated in a silver-halide emulsion the dye imparts to it a range of sensitiveness from 500 to $670\mu\mu$ with a maximum at about $570\mu\mu$.

*Example 17.*—The dye bis-[3-ethyl-6-diethylamino-benzthiazole - (2)] - trimethinecyanine, iodide corresponding to the formula

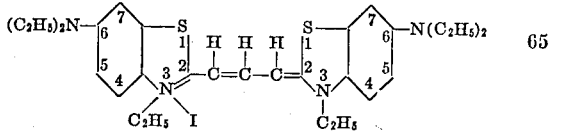

is obtained by boiling for about two hours a mixture of 10 grams 2 - methyl - 6 - diethylamino-benzthiazole-ethyl-iodide, 20 cc. of pyridine and 10 cc. of ethyl orthoformate. On addition of a small quantity of a solution of potassium iodide of about 5 per cent. strength to the cooled reaction mixture the dye is precipitated in the form of green needles.

After the dye has been recrystallized from alcohol the alcoholic solution of the dye shows an absorption maximum at a wave length of about 625μμ.

Incorporated in a silver halide emulsion the dye imparts to it a range of sensitiveness from about 515μμ to about 730μμ, with a maximum at about 655μμ.

The dye bis-[3-ethyl-5-diethylamino-benzthiazole-(2)]-trimethinecyanine iodide corresponding to the formula

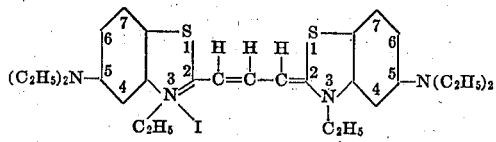

is produced in a completely analogous manner by using 2-methyl-5-diethylamino-benzthiazole-ethyl-iodide instead of 2-methyl-6-diethylamino-benzthiazole-ethyl-iodide.

The dye shows the same absorption maximum at a wave length of about 625μμ as the 6-bis-diethylamino dye. The range of sensitiveness which the dye imparts to a silver halide emulsion is likewise that of the 6-bis diethylamino dye, namely 515μμ to 730μμ, with a maximum at about 655μμ. The spectrogram of this dye is shown in the accompanying drawing.

*Example 18.*—For producing the dye bis-[3.4.6-trimethyl-7-acetylamino-benzthiazole-(2)]-trimethinecyanine; bromide corresponding to the formula

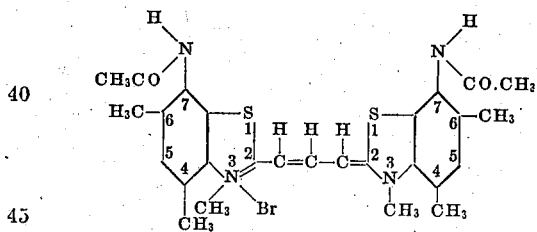

5 grams of 2.4.6-trimethyl-7-acetylamino-benzthiazole-dimethylsulfate, 5 cc. ethyl orthoformate and 10 cc. of dry pyridine are boiled for about one hour. After cooling the dye is precipitated by addition of a small quantity of a solution of potassium bromide of about 5 per cent strength.

The dye dissolves in alcohol with a red violet color and the solution shows an absorption maximum at a wave length of about 570μμ.

*Example 19.*—For producing the dye bis-[3-ethyl-6-diethylamino-benzselenazole-(2)]-trimethinecyanine; iodide corresponding to the formula

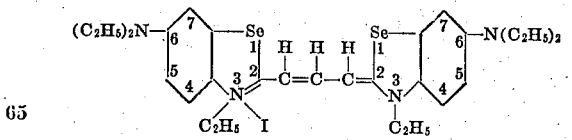

5 grams of 2-methyl-6-diethylamino-benzselenazole-ethyl-iodide are dissolved in 15 cc. of hot pyridine and this mixture is boiled for about 1 hour with 5 cc. of ethyl ortho-formate. After cooling the dye is precipitated in the blue pyridine solution by addition of a small quantity of an aqueous solution of potassium iodide of about 5 per cent. strength. Then the dye is separated from the mixture by filtration and is after recrystallization from alcohol obtained in the form of a black blue crystal powder.

In the alcoholic solution the dye has an absorption maximum at a wave length of about 640μμ.

Incorporated in a silver-halide emulsion the dye imparts to it a range of sensitiveness from about 510 to 750μμ with a maximum at about 675μμ.

*Example 20.*—For producing the dye [3-ethyl-5-diethylamino-benzthiazole-(2)]-[3-ethyl-6-ethoxybenzthiazole-(2)]-trimethinecyanine perchlorate corresponding to the formula

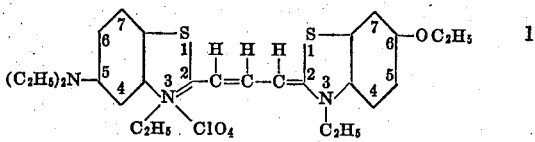

we proceed as follows:

A. 9 grams of 5-diethylamino-2-methyl-benzthiazole ethyl-iodide and 6.5 grams of diphenyl-formamidine are intimately mixed; to this mixture 25 cc. of acetic anhydride are added and the whole is boiled for ¾ hour under reflux (about 140° C.). After cooling the reaction mixture ether is added drop by drop while stirring the mixture and rubbing the walls of the vessel. This procedure is continued until the formation of crystals occurs at the walls of the vessel. Now, the intermediate product is precipitated by cooling the reaction mixture with a freezing mixture and separated by filtration. The intermediate product which melts in its pure state at 218 to 219° C. corresponds probably to the formula

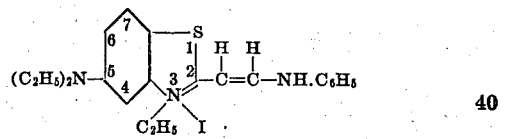

B. 4 grams of the intermediate product are boiled with 2 grams of 2-ethoxy-6-benzthiazole-ethyl-iodide and 20 cc. of pyridine for ¾ hour under reflux (about 125 to 130° C.). The dye is then precipitated by addition of a few cc. of an aqueous solution of potassium iodide of 10 per cent. strength and water, separated by filtration, dissolved in alcohol and precipitated from its alcoholic solution in the form of its perchlorate by addition of a few cc. of an aqueous solution of sodium perchlorate of 1 per cent. strength and water.

After recrystallization of the dye, its alcoholic solution shows an absorption maximum at a wave length of about 600μμ.

Incorporated in a silver-halide emulsion the dye imparts to it a range of sensitiveness from about 500μμ to about 715μμ with a maximum at about 625μμ.

*Example 21.*—For producing the dye [3-ethyl-5-diethylamino-benzthiazole-(2)]-[3-ethyl-benzthiazole-(2)]-trimethinecyanine perchlorate corresponding to the formula

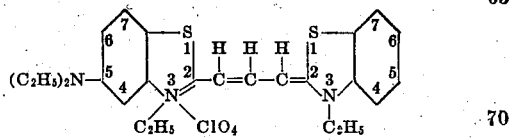

4 grams of the intermediate product obtainable from 5-diethylamino-2-methyl-benzthiazole-ethyl-iodide and diphenyl-formamidine in the manner described in Example 20 sub A, are boiled with 2 grams of 2-methyl-benzthiazole-ethyl-iodide and 20 cc. of pyridine for ¾ hour under reflux (125 to 130° C.). The reaction mixture is worked up in the manner indicated in Example 20.

The dye shows in its alcoholic solution an absorption maximum at a wave length of about 595μμ.

Incorporated in a silver-halide emulsion the dye imparts to it a range of sensitiveness from about 510μμ to about 720μμ with a maximum at about 635μμ.

*Example 22.*—The dye [3 - ethyl - 6 - diethyl-aminobenzthiazole-(2)]-[3-ethyl-benzselenazole-(2)]-methinecyanine iodide corresponding to the formula

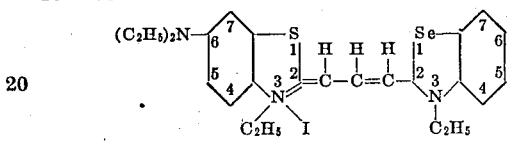

is produced in the same manner as described in the foregoing examples by starting from the corresponding materials.

The dye shows in its alcoholic solution an absorption maximum at a wave length of about 600μμ.

A silver-halide emulsion provided with this dye acquires a sensitiveness to waves from about 510μμ to about 715μμ with a maximum at about 630μμ.

*Example 23.*—The dye [3-ethyl-5-diethylami-no-benzthiazole-(2)]-[3-ethyl-6 - diethylamino-benzthiazole - (2)] - trimethinecyanine perchlorate corresponding to the formula

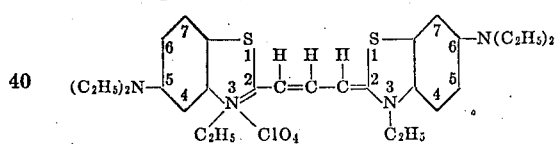

may be produced by mixing 1.5 grams of the intermediate product described in Example 20 with 2.3 grams of 6-diethylamino-2-methylbenzothiazole-ethyl-iodide and 15 cc. of pyridine, boiling this mixture for ¾ hour under reflux and working up the reaction mixture as indicated in Example 20. The dye may likewise be obtained as iodide or bromide.

The alcoholic solution of the dye has an absorption maximum at a wave length of about 625μμ.

A silver-halide emulsion containing the dye is sensitized to the waves from about 510μμ to about 730μμ, with a maximum at about 655μμ.

*Example 24.*—For producing [3-ethyl-5-diethylamino-benzthiazole-(2)] - [1 - ethyl-quino - (2)]-trimethinecyanine iodide corresponding to the formula

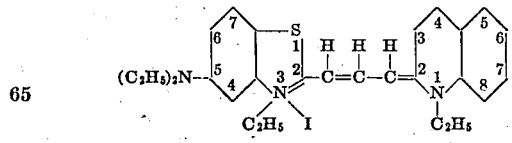

5 grams of the intermediate product obtainable from 5-diethylamino-2 - methyl - benzthiazole - ethyl-iodide and diphenyl-formamidine as described in Example 20, are boiled for 2½ hours with 4 grams of quinaldine-ethyl-iodide and 15 cc. of pyridine under reflux. The dye which forms is precipitated by addition of a few cc. of an aqueous solution of potassium iodide of 10 per cent. strength and water and is recrystallized from alcohol.

The alcoholic solution of the dye has an absorption maximum at a wave length of about 615μμ.

Incorporated in a silver halide emulsion the dye imparts to it a range of sensitiveness to waves from about 515μμ to about 730μμ with a very flat maximum at about 645μμ.

*Example 25.*—For producing the dye [3-ethyl-5-diethylamino - benzthiazole - (2)] - [1.3 - trimethyl-indole-(2)]-trimethinecyanine iodide corresponding to the formula

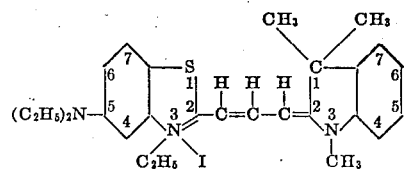

2 grams of the intermediate product obtainable from 5 - diethyl - 2 - methyl - benzthiazole-ethyl-iodide and diphenyl-formamidine are boiled for 1½ hours with 1.5 grams of trimethylindol-methyl-iodide and 10 cc. of pyridine under reflux. To this mixture while still warm there are added a few cc. of an aqueous solution of potassium iodide and water. While cooling the reaction mixture the dye separates in the form of its iodide. Eventually as by-product formed symmetrical carbocyanine from trimethyl-indol-ethyl-iodide may be removed by fractional crystallization.

In its alcoholic solution the dye shows an absorption maximum at a wave length of about 585μμ.

Incorporated in a silver-halide emulsion the dye imparts to it a range of sensitiveness from about 510μμ to about 700μμ with a maximum at about 620μμ.

Further dyes which may be prepared according to the methods described in the foregoing examples are:

(1) [3-ethyl-6-diethylamino-(2)] - [3 - ethyl - benzthiazole-(2)]-trimethinecyanine perchlorate corresponding to the formula

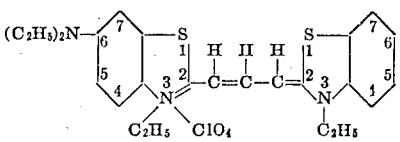

Absorption maximum of the alcoholic solution: about 600μμ.

An emulsion containing the dye is sensitized to waves from about 500μμ to about 720μμ, with a maximum at about 630μμ.

(2) [3 - ethyl - 6 - diethylamino - benzthiazole-(2)] - [3 - ethyl-benzselenazole - (2)] - trimethinecyanine-iodide corresponding to the formula

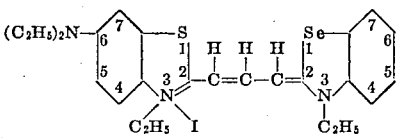

Absorption maximum of the alcoholic solution: about 600μμ. An emulsion containing the dye is sensitized to waves from about 520μμ to about 710μμ, with a maximum at about 630μμ.

(3) [3.- ethyl - 6 - diethylamino-benzthiazole - (2)]-[3-ethyl-6-ethoxy-benzthiazole - (2)] - trimethinecyanine perchlorate corresponding to the formula

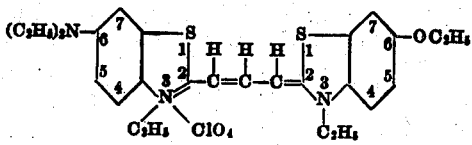

Absorption maximum of the alcoholic solution: about 603μμ. An emulsion containing the dye is sensitized to waves from about 500μμ to about 730μμ, with a maximum at about 645μμ.

(4) [3 - ethyl - 5 - diethylamino-benzthiazole - (2)]-[1-ethyl-6-methyl-quinoline - (2)] - methinecyanine iodide corresponding to the formula

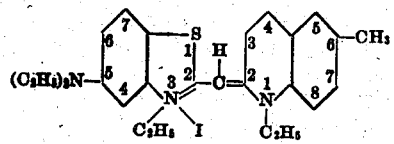

Absorption maximum of the alcoholic solution: about 525μμ.

An emulsion containing the dye is sensitized to waves from about 500μμ to about 650μμ with a maximum at about 570μμ.

(5) [3 - ethyl - 6 - acetylamino - benzthiazole - (2)]-[1-ethyl-6-methyl-quinoline - (2)] - methinecyanine iodide corresponding to the formula

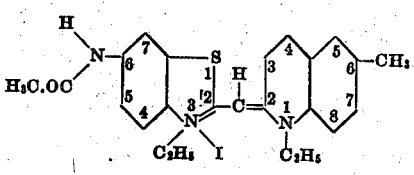

An emulsion containing the dye is sensitized to waves from about 505μμ to about 575μμ with a maximum at about 525μμ.

(6) [3-ethyl - 6 - benzoylamino - benzthiazole - (2)]-[1-ethyl-6-methyl-quino-(2)] - methinecyanine iodide corresponding to the formula

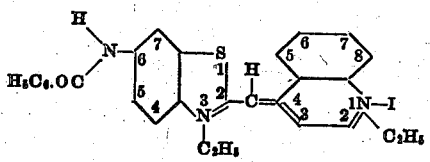

An emulsion containing the dye is sensitized to waves from about 480μμ to about 605μμ with a maximum at about 550μμ.

(7) [3-ethyl-6-propionylamino - benzthiazole - (2)]-[1-ethyl-6-methyl-quinoline - (2)] - methinecyanine iodide corresponding to the formula

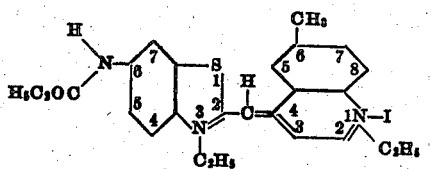

An emulsion containing the dye is sensitized to waves from about 500μμ to about 600μμ with a maximum at about 540μμ.

It is to be understood that our invention is not limited to the foregoing examples nor to the specific details given therein. Numerous other embodiments are possible and we contemplate as included within our invention all such modifications and equivalents as fall within the scope of the appended claims. Thus Y' in the general formula may also represent oxygen. We obtain then benzthio-oxo-cyanines or benzthio-oxo-carbocyanines. In the same manner Y in the general formula may represent C(CH₃)₂ and oxygen.

The formulae of the dyes given herein represent the molecular structure of our new dyes so far as to our actual knowledge. If, however, in future it should become evident that the formulae do not exactly correspond to the dyes this fact will not affect our invention since the dyes will be easily identified by the method of producing the same which has been fully described in the examples. The maxima of sensitiveness of our dyes are all very flat and the values indicated may not be regarded too critical.

The selenocarbocyanines substituted in the central atom (β-position) of the carbon bridge form the subject matter of the copending applications Ser. No. 617,468, filed June 17, 1932, by Wilhelm Schneider and Ser. No. 591,389, filed Feb. 6, 1932, by Walter Zeh, and are not claimed in this application.

In the appended claims the expression "an amino group" is to be understood as including not only the amino group but also substituted amino groups.

What we claim is:

1. A photographic material which comprises a silver halide emulsion containing a trimethinecyanine dye selected from the group consisting of benzthiazole trimethinecyanine salts and benzselenazole trimethinecyanine salts symmetrically substituted in the benzene nuclei by a radical selected from the group consisting of amino groups, dialkylamino groups and acylamino groups.

2. A photographic material which comprises a silver halide emulsion containing a trimethinecyanine dye selected from the group consisting of benzthiazole trimethinecyanine salts and benzselenazole trimethinecyanine salts symmetrically substituted in the benzene nuclei by a radical selected from the group consisting of amino groups, dialkylamino groups and acylamino groups, and a radical selected from the group consisting of alkyl and alkoxy.

3. A photographic material which comprises a silver halide emulsion containing a trimethinecyanine dye selected from the group consisting of benzthiazole trimethinecyanine salts and benzselenazole trimethinecyanine salts symmetrically substituted in the benzene nuclei by an amino group.

4. A photographic material which comprises a silver halide emulsion containing a trimethinecyanine dye selected from the group consisting of benzthiazole trimethinecyanine salts and benzselenazole trimethinecyanine salts symmetrically substituted in the benzene nuclei by an amino group and having linked to the central carbon atom of the trimethenyl chain an alkyl group.

5. A photographic material which comprises a silver halide emulsion containing a trimethinecyanine dye selected from the group consisting of benzthiazole trimethinecyanine salts and benzselenazole trimethinecyanine salts symmetrically substituted in the benzene nuclei by an amino group and having linked to the central carbon atom of the trimethenyl chain an ethyl group.

6. A photographic material which comprises a silver halide emulsion containing a trimethinecyanine dye selected from the group consisting of benzthiazole trimethinecyanine salts and benzselenazole trimethine salts symmetrically substituted in the benzene nuclei by an amino group and having linked to the central carbon atom of the trimethenyl chain a methyl group.

7. A photographic material which comprises a silver halide emulsion containing bis-[3-ethyl-5-diethylamino-6-methyl-benzthiazole-(2)]-β-methyl-trimethinecyanine iodide corresponding with the formula

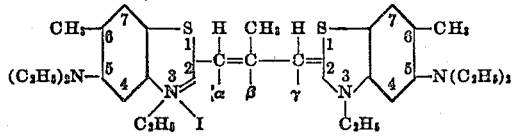

8. A photographic material which comprises a silver halide emulsion containing bis-[3-ethyl-5-diethylamino-benzthiazole-(2)]-trimethinecyanine iodide corresponding with the formula

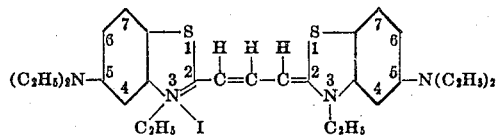

9. A photographic material which comprises a silver halide emulsion containing bis-[3-ethyl-6-diethylamino-benzselenazole-(2)]-trimethinecyanine iodide corresponding with the formula

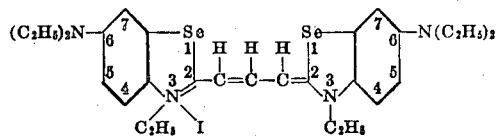

WALTER DIETERLE.
WALTER ZEH.
WERNER ZERWECK.